United States Patent
Brown et al.

(10) Patent No.: US 9,857,954 B2
(45) Date of Patent: *Jan. 2, 2018

(54) DYNAMIC, OPTIMIZED PLACEMENT OF COMPUTER-BASED WINDOWS

(71) Applicant: International Business Machines Corporation, Armonk, NY (US)

(72) Inventors: Gene L. Brown, Durham, CT (US); Brendan F. Coffey, Rhinebeck, NY (US); Christopher J. Dawson, Arlington, VA (US); Clifford V. Harris, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/350,382

(22) Filed: Nov. 14, 2016

(65) Prior Publication Data

US 2017/0068429 A1     Mar. 9, 2017

Related U.S. Application Data

(63) Continuation of application No. 15/014,253, filed on Feb. 3, 2016, now Pat. No. 9,524,074, which is a
(Continued)

(51) Int. Cl.
*G06F 3/0481* (2013.01)
*G06F 3/0484* (2013.01)
(Continued)

(52) U.S. Cl.
CPC ........ *G06F 3/04845* (2013.01); *G06F 3/0481* (2013.01); *G06F 3/04817* (2013.01);
(Continued)

(58) Field of Classification Search
None
See application file for complete search history.

(56) References Cited

U.S. PATENT DOCUMENTS

| 5,418,912 A | 5/1995 | Christenson |
| 8,464,177 B2 | 6/2013 | Ben-Yoseph et al. |

(Continued)

OTHER PUBLICATIONS

Luders, P., et al. "The Dynamic Screen—Beyond the Limits of Traditional Graphic User Interfaces", 13th World Computer Congress 94, vol. 1, Copyright 1994 IFIP.
(Continued)

*Primary Examiner* — Abdullah Al Kawsar
*Assistant Examiner* — Daniel Samwel
(74) *Attorney, Agent, or Firm* — Daniel R. Simek

(57) ABSTRACT

A computer system displays a first window corresponding to an aspect of a first executing program in a first display area on one or more display devices. The computer system identifies an activity of a second program. The computer system determines whether the activity of the second program meets a threshold of priority. In response to determining that the activity meets the threshold, the computer system manipulates the first window such that the display area can be distributed, at least partially, between the first window and a second window corresponding to the activity of the second program. The computer system displays the second window with the first window within the display area.

1 Claim, 5 Drawing Sheets

Related U.S. Application Data continuation of application No. 14/271,505, filed on May 7, 2014.

(51) Int. Cl.
*G06F 3/14* (2006.01)
*G09G 5/14* (2006.01)

(52) U.S. Cl.
CPC .............. *G06F 3/1423* (2013.01); *G09G 5/14* (2013.01); *G06F 2203/04803* (2013.01); *G09G 2340/0464* (2013.01)

(56) References Cited

U.S. PATENT DOCUMENTS

| | | |
|---|---|---|
| 9,037,984 B2 | 5/2015 | Park et al. |
| 9,092,186 B2 | 7/2015 | Guduru |
| 9,373,143 B2 | 6/2016 | Jezek, Jr. |
| 2002/0196287 A1 | 12/2002 | Taylor et al. |
| 2005/0088452 A1 | 4/2005 | Hanggie et al. |
| 2007/0174291 A1 | 7/2007 | Cooper et al. |
| 2007/0250788 A1 | 10/2007 | Rigolet |
| 2010/0117810 A1 | 5/2010 | Hagiwara et al. |
| 2010/0281423 A1 | 11/2010 | Kano et al. |
| 2011/0028203 A1 | 2/2011 | Agarwal et al. |
| 2012/0081271 A1 | 4/2012 | Gimpl et al. |
| 2012/0174104 A1 | 7/2012 | Neogi et al. |
| 2013/0305184 A1 | 11/2013 | Kim et al. |
| 2014/0258918 A1 | 9/2014 | Morishima et al. |
| 2014/0298253 A1 | 10/2014 | Jin et al. |
| 2014/0317526 A1 | 10/2014 | Hoffman |
| 2015/0324095 A1 | 11/2015 | Brown et al. |
| 2016/0170622 A1 | 6/2016 | Ladd et al. |

OTHER PUBLICATIONS

IBM Corp., "AS/400 Client/Server Performance using the Windows Clients", International Tech Support, Dec. 1996, SG24-4526-01.
"A System and Method for Optimizing Computer Application and Server Platform Selection", An IP.com Prior Art Database Technical Disclosure, IPCOM000214051D, Jan. 6, 2012.
"Dynamic window manager", Wikipedia, the free encyclopedia, printed Mar. 3, 2014, p. 1-2, <http://en.wikipedia.org/wiki/Dynamic_window_manager>.
"Window manager", Wikipedia, the free encyclopedia, printed Mar. 3, 2014, p. 1-7, <http://en.wikipedia.org/wiki/Window_manager>.
"OS X Mavericks", Wikipedia, the free encyclopedia, printed Apr. 21, 2014, p. 1-13, <http://en.wikipedia.org/wiki/OS_X_Mavericks>.
List of IBM Patents or Patent Applications Treated as Related, Appendix P, Filed Herewith.
Brown, et al., U.S. Appl. No. 14/271,505, filed May 7, 2014.
U.S. Appl. No. 15/014,253, filed Feb. 3, 2016; Entitled "Dynamic, Optimized Placement of Computer-Based Windows".
U.S. Appl. No. 15/350,462, filed Nov. 14, 2016; Entitled "Dynamic, Optimized Placement of Computer-Based Windows".

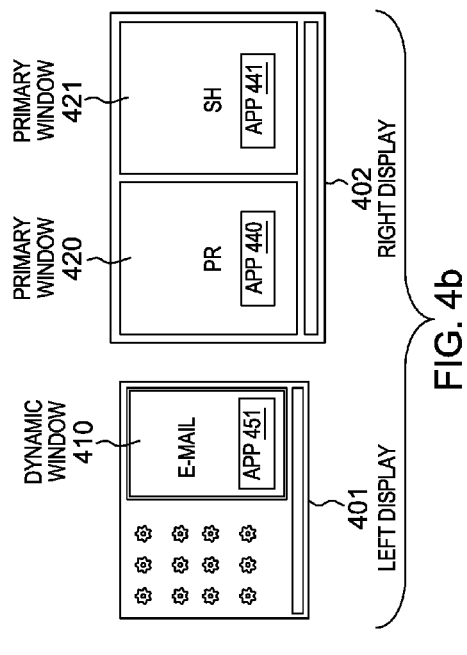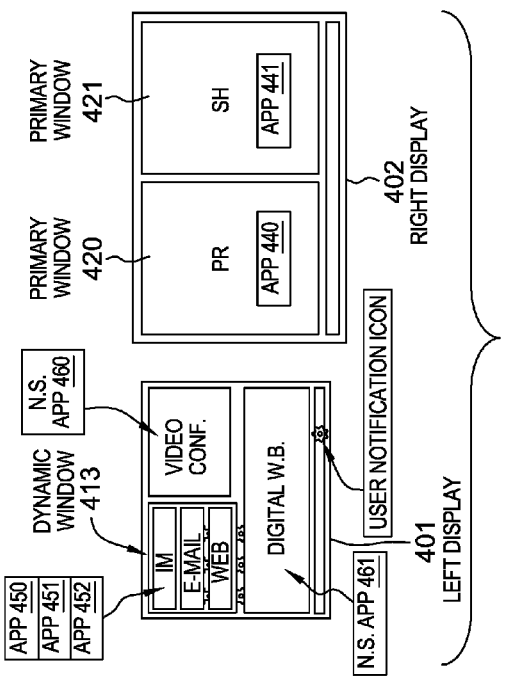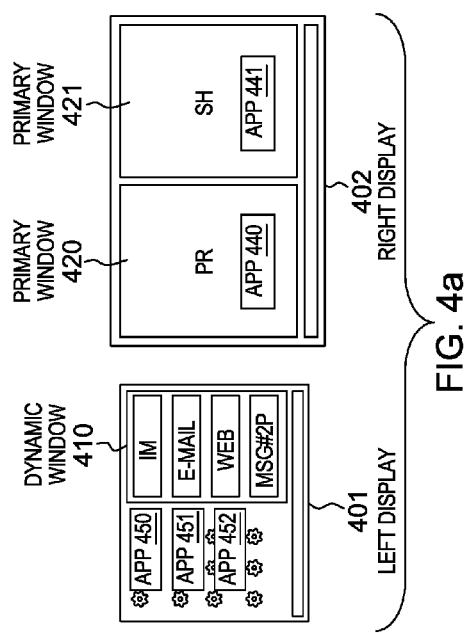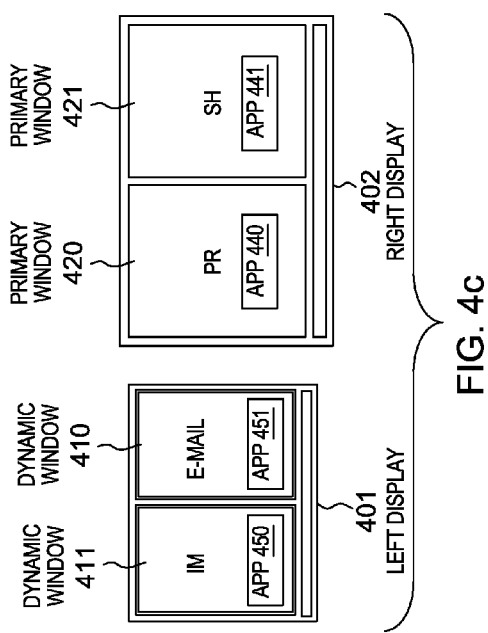

DYNAMIC, OPTIMIZED PLACEMENT OF COMPUTER-BASED WINDOWS

FIELD OF THE INVENTION

The present invention relates generally to the field of computer software, and more particularly to graphical user interfaces (GUIs).

BACKGROUND OF THE INVENTION

Computer operating systems typically have a shell that provides a graphical user interface (GUI) to an end-user. The shell consists of one or a combination of software components that provide direct communication between the user and the operating system. The graphical user interface typically provides a graphical icon-oriented and/or menu driven environment for the user to interact with the operating system and will be often based on a "desktop" metaphor. The GUI environment typically occupies the entire surface of a single display device, extends to a "virtual window" comprising an area larger than the display device but is restricted to displaying what fits within the devices active area, may span multiple display devices, and hosts subordinate user interface objects such as icons, menus, cursors, and windows. Among the types of rendered objects hosted by the GUI environment are visually delineated areas of the screen known as windows. A window will be typically dedicated to a unique user activity and will be created and managed by either a third-party software application or a system application. Each window behaves and displays its content independently as if it were a virtual display device under control of its particular application program. Windows can typically be interactively resized, moved around the display, and arranged in stacked order so as to fully or partially overlap one another by the user. In some windowing environments, a window can assume discreet visual or behavioral states, such as minimized in size to an icon or maximized in size to occupy the entire display surface.

Conventionally, the size and shape of the active area will be fixed at startup and cannot be dynamically changed. A single, selected window has the "focus" at any given time and will be receptive to the user's input. The user can direct input focus to another window by clicking the window with a mouse or other pointer device or by employing a system-defined keyboard shortcut or key combination. This allows the user to work efficiently with multiple application programs, files, and documents in a manner similar to the real world scenario of managing paper documents and other items which can be arbitrarily stacked or arranged on a physical desktop.

Current dynamic window managers tile the display environment with windows based on preset layouts. The user may manually switch between these layouts. Layouts typically have master and slave areas. The master area shows one window but will be not restricted to such. The area within the master window will be not affected by other windows opening in the GUI. New windows open in the slave area. The master and slave windows may be configured to allow some of the GUI area or desktop to be visible.

SUMMARY

Embodiments of the present invention disclose a method, computer program product, and system for providing dynamic placement of computer-based windows. A computer system displays a first window corresponding to an aspect of a first executing program in a first display area on one or more display devices. The computer system identifies an activity of a second program. The computer system determines whether the activity of the second program meets a threshold of priority. In response to determining that the activity meets the threshold the computer system manipulates the first window such that the display area can be distributed, at least partially, between the first window and a second window corresponding to the activity of the second program. The computer system displays the second window with the first window within the display area.

BRIEF DESCRIPTION OF THE SEVERAL VIEWS OF THE DRAWINGS

FIGS. 4a thru 4d depict a graphical representation of changes to display device(s) enacting one embodiment of this invention as seen by the user as the optimization program responds to metadata triggers defined in a schema. FIG. 4d depicts a graphical representation of manual changes initiated by the user to windows and applications within the display device(s) and a response to these actions in the form of a visual cue placed within the task bar.

DETAILED DESCRIPTION

Figure 1:
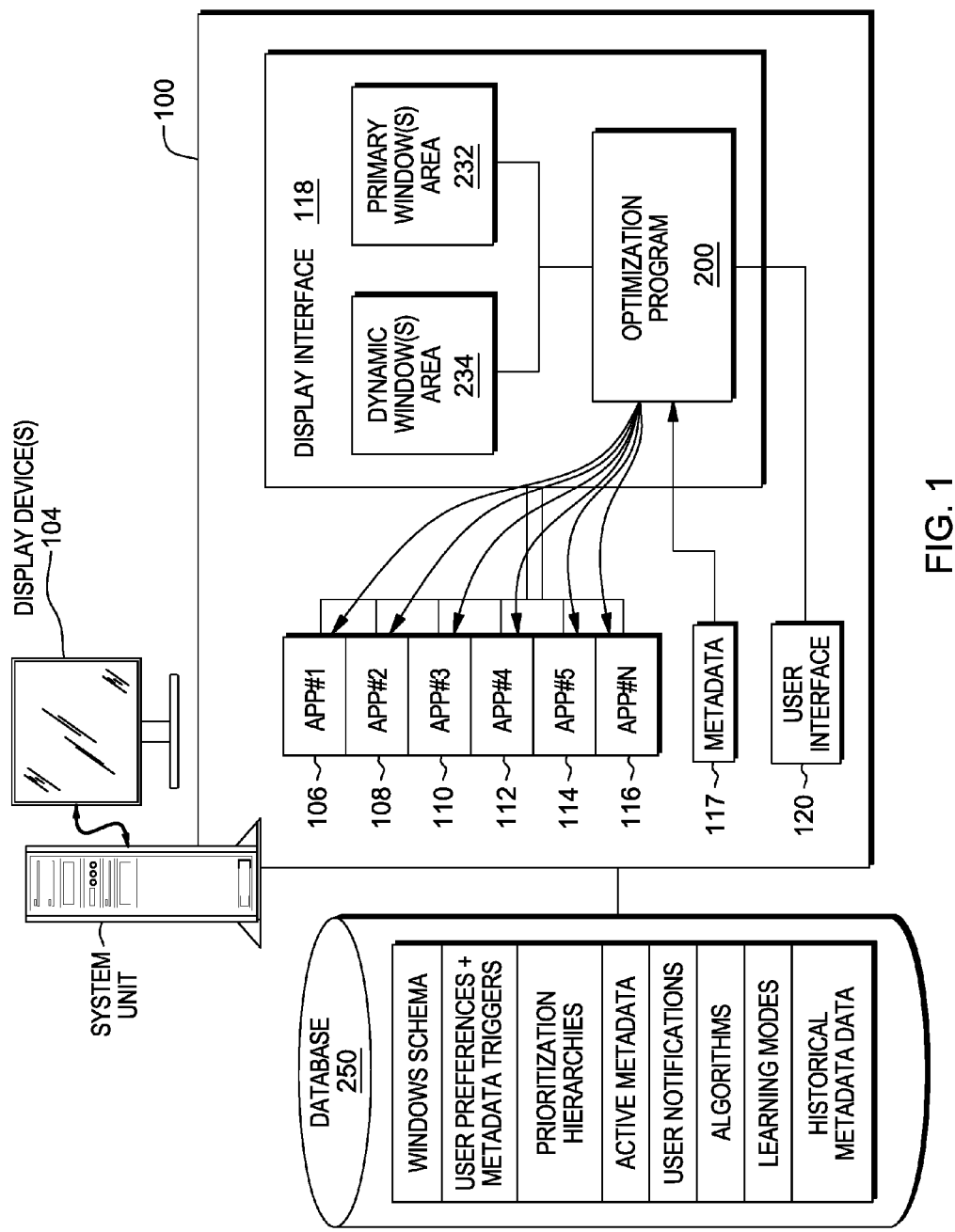
FIG. 1 is a functional block diagram illustrating a single computer system embodiment of control and optimization environment to produce GUI windows across one or more display devices.

Graphical user interfaces (GUIs) are prevalent across computing environments today, and the user acts on information or programs seen on display devices through interface elements commonly known as "windows". As the number of available applications has exploded and the interactivity of these applications to communications and the GUI environment has increased, so has the amount of desktop "clutter" and the level of distraction. Embodiments of the present invention recognize that user efficiency in a GUI environment can be improved by controlling clutter on the display(s) and filtering the distractions in forms, such as instant messages, additional windows or "pop-ups", or notifications that are deemed as non-critical by the user based on the current work-in-progress and importance assigned to specific applications or information prioritized via analysis of various metadata streams. Embodiments of the present invention disclose a method, computer program product, and system for dynamically placing GUI windows on one or more display devices based on a combination of: user preferences, prioritization hierarchies, metadata triggers, and optimized display arrangements, herein referred to as schema. Schema may be comprised of a plurality of data structures. Rules assigned to a display area or application are a subset of the plurality of data structures within a schema. Rules can be specifically assigned a display area or an executing application. In one embodiment, user preferences, pre-defined metadata triggers, application metadata, and system metadata interact with the programs to produce an arrangement of GUI windows that responds to new information such as an e-mail with a specific subject line that the user has identified as a trigger as an alternative to a simple audio or visual cue. Prioritization hierarchies defined within a schema enable an embodiment of this invention to respond to complex or overlapping series of events, determine if user preferences may be overridden, or resolve precedence issues between metadata triggers.

A simpler embodiment of a prioritization hierarchy comprises a list of programs which are assigned priority levels wherein a display area is assigned a "threshold of priority" value and only those programs having a priority level equal to or greater than the threshold can be assigned to this display area. An alternate embodiment of the use of a priority level is constructing a ranking of events or programs relative to the threshold of priority value. The relative priority levels of activities or programs becomes the ranking applied to a plurality of programs within a queue assigned to a display area. Examples of a relative priority level may include, but are not limited to, percentage of threshold value, percentage of threshold value+/−biasing factor, percentage of threshold value+/−activity level bias, and time in queue. The ranking analysis may be comprised of one or more methods determining the relative priority of a program within the queue.

Another embodiment of this invention can allow the GUI environment to reconfigure itself if a display device becomes active/inactive. Furthermore, another embodiment of this invention can allow additional sensitization/desensitization of the prioritization algorithm or optimization program based on a time horizon, such as a deadline defined by the user. Similarly, an activity monitor may detect that a program is accessed frequently by a user and for long periods of time. A program experiencing an increased activity level may have its assigned priority level adjusted. Alternatively, a program that is tracked by an activity monitor that experiences little to no activity may have its priority level decreased, which in turn lowers its ranking in a display queue resulting in the program disappearing from the display area if there are a fixed number of program windows open based on the schema. The program will still be active, just not visible.

FIG. 1 is a functional block diagram illustrating a single computer system embodiment of a control and optimization environment to produce GUI windows across one or more display devices. The computing environment 100 may be, but is not limited to, a laptop computer, a tablet computer, a netbook computer, a personal computer (PC), a desktop computer, a personal digital assistant (PDA), a smart phone, or any programmable electronic device capable of interacting with a user through a GUI. Computing environment 100 interconnects with one or more display device(s) 104 by cables, wired, wireless, or fiber optic connections or networks. Display device(s) 104 may be a discreet monitor or TV; integrated display as on a laptop computer, a tablet computer, a netbook computer, a personal digital assistant (PDA), or a smart phone; digital projector; VR goggles; helmets; heads-up display or any programmable electronic device capable of producing an image. Display device(s) associated with electronic devices external to computing environment 100, such as but not limited to, a tablet computer, a netbook computer, a personal digital assistant (PDA), or a smart phone executing an embodiment of this invention may have the advantage of operating more synchronously when contrasted to display devices "slaved" to the computing environment 100.

Display interface 118 embodies the general GUI environment in which, for example, applications 106, 108, 110, 112, 114, and 116 are present and executing within windows of varying sizes and/or locations.

User interface 120 controls or interacts with optimization program 200. User interface 120 preforms at least one of, but not limited to, activating optimization program 200, selecting schema, defining prioritization hierarchies, creating metadata triggers, initiating learning and monitoring modes, and assigning applications to primary window area(s) 232 or dynamic windows area(s) 234 within schema, and schema naming.

Embodiments of the present invention control display interface 118 and partitions some or all of a GUI environment into primary window area(s) 232 and dynamic window area(s) 234. The primary window area(s) 232 and dynamic window area(s) 234 provide locations to display the visual aspects of executing programs. Primary window area(s) 232 and dynamic window area(s) 234 will be positioned and distributed across display device(s) 104 based on control from an optimization program or algorithm analyzing information stored in database 250 and active metadata 117 that can include but not restricted to, system information, available display(s) information, active application metadata, communication metadata (but not limited to LAN, WAN, Scanner, Printer, etc.), or I/O devices (keyboard, mouse, joystick, smartphone, etc.) to minimize desktop clutter. Areas of the GUI environment not under the control of an embodiment of the present invention may default to the native behavior as related to the computer's operating system.

Optimization program 200 provides a capability of dynamic control and may interact with the GUI environment of a computing system via a collection of applications and windows which may respond to a plurality of events. Such events may include: analyzing metadata for keyword triggers, adding display device(s), or removing display device(s) from the computing system's environment. Schema are the templates and rules which govern responses of optimization program 200 to activities and needs of a user. For example, optimization program 200 analyzes a schema and determines which metadata modifications are within the scope of the schema e.g., an active window is reshaped for ease of reading (enlarging an e-mail window to access attached information then returning the window to its original size and location). Optimization program 200 may also determine when a change is within the schema's scope and initiates a response if the changes are outside the schema's scope.

Optimization program 200 analyzes user preferences, system and application metadata, and historical data to create optimized windows configurations. A prioritization hierarchy passed to optimization program 200 can itself come from predefined user preferences and metadata triggers associated with schema or derived by other algorithms that monitor application activity or the user's behavior over time. This behavior will be controlled by the learning mode that the user selects.

Figure 2:
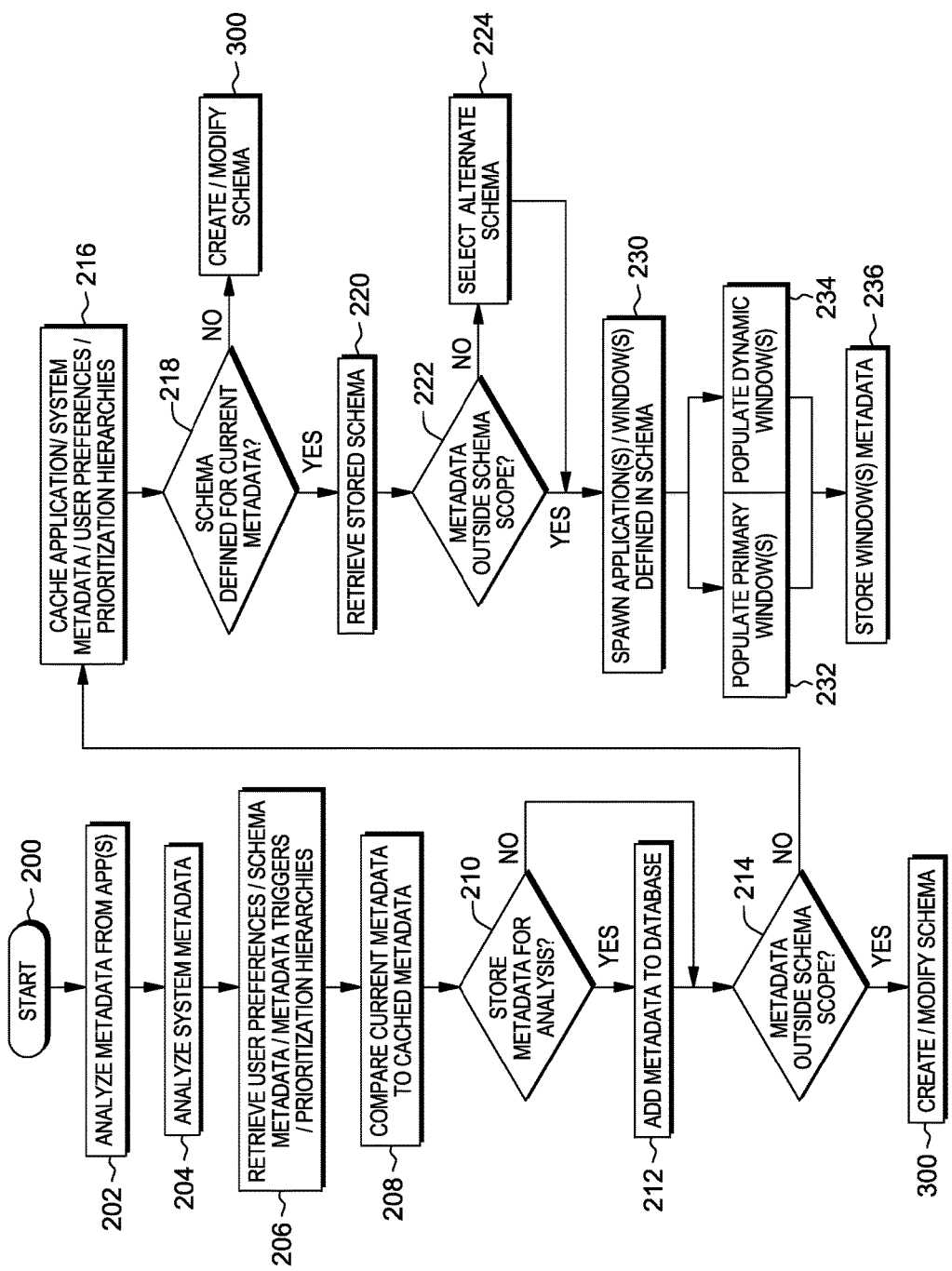
FIG. 2 is a flowchart depicting operational steps of an optimization program, within the system environment of FIG. 1, for deciding on which windows schema, in accordance with an embodiment of the present invention to use based on user preferences and metadata from various sources.

The steps on the flowchart in FIG. 2 may or may not happen in a concurrent fashion. Data transfers can occur synchronously, asynchronously, or delayed.

FIG. 2 represents the monitoring and control steps that optimization program 200 executes to create a combination thereof: primary window area(s) 232, dynamic window area(s) 234, and populates windows with applications. The flowchart contains both monitoring functions and error handling relevant to new schema or modification to current schema routine, initiated at block 300 and described in more detail with regard to FIG. 3. Whereas optimization program 200 is continually monitoring system data and the GUI environment, any new application window manually added to the GUI environment may be considered entering optimization program 200 at the start block.

Optimization program 200 analyzes metadata from applications (step 202). Metadata from applications may include, but is not limited to, application name and version number, application window size and location, dialog box modality, subject line text, access authority, data owner, script and macro names, URL's, user ID and password, and date last accessed. Application metadata forms the basis for keyword or information based triggers, e.g., restrict instant messaging to automatically open for a specific list of user ID's, or flag any communication for file containing keyword "deadline". Application metadata related to the size of an application's window may also determine the number of application windows which may fit on a display device of a given size without changing the scaling of the application window.

Optimization program 200 analyzes system environment metadata comprised within metadata 117 (step 204). Metadata from the system environment may include, but are not limited to, current time and date, battery charge, devices connected to system unit, networking information, size and resolution of display devices, sound control on/off/mute/volume level, and devices connected via wireless communication. System environment metadata provides optimization program 200 resource information which may identify constraints on schema to be used to create the dynamic window structures within the GUI environment.

Optimization program 200 retrieves a plurality of information (step 206) from database 250. The information may include user preferences, schema metadata, metadata triggers, or prioritization hierarchies. User preferences may include the criteria used within decision steps. For example, immediate user notification=yes (for all occurrences). Algorithms may analyze prioritization hierarchies within schema to determine responses for, but not limited to, metadata updates, multiple triggers activating, application activity, or more applications windows required than permitted in dynamic window area(s) 234 as defined by current schema.

Additionally, optimization program 200 may compare current metadata with cached metadata from a previous iteration (step 208). Initially, there will be no cached metadata. User preferences may determine which metadata fields may be selected for comparison and which metadata is to be stored in database 250: current metadata, cached metadata, similarities or differences, or a combination thereof. Similarly, retrieved schema metadata may be compared with the current metadata to rank or pre-select possible schema from database 250 for subsequent scope analysis.

In one embodiment, user preferences retrieved from database 250 may similarly determine if current metadata, cached metadata, similarities or differences, or a combination thereof will be stored for analysis. For example, an incremental comparison may be done on the applications in the dynamic window area(s) 234 resulting with the detection of a change from the initial schema; however, the change mimics the behavior of a lower priority dynamic window configuration and is determined not to be a significant difference and therefore not stored (no branch, decision 210). If it is determined to store metadata for analysis (yes branch, decision 210), then optimization program 200 adds the metadata to database 250 (step 212). For example, multiple instances of a metadata trigger keyword will occur, but more significantly the metadata trigger keyword is associated with multiple user ID's.

Metadata analysis may be done off-line by the user or by an algorithm executing within optimization program 200. For example, analysis of stored metadata may provide the user trend information as related to: list of common instant message subjects, application usage durations, or frequency of schema swapping. Analysis of instant message subjects may allow the user to improve filtering and prioritization triggers. Analysis of application usage durations for applications, which are paid for by the number of concurrently active "seats", may indicate the possibility for cost reductions.

In one embodiment, optimization program 200 compares current metadata with the scope of the schema to determine whether the metadata is outside the scope of the schema (decision 214). If the comparison is outside the scope of the schema (yes branch, decision 214), optimization program 200 initiates actions based on user preferences and prioritization information. For example, if no schema exists that incorporates all applicable metadata and available display device(s), optimization program 200 initiates the create/redefine schema routine (block 300). In an alternate embodiment where no schema exist, the default (no branch, decision 214) allows current data to be subsequently cached (step 216) prior to schema creation.

Optimization program 200 caches a plurality of data comprised of: current system metadata, current application metadata, user preferences, and prioritization hierarchies.

If no schema exist, optimization program 200 defaults (no branch, decision 218) to the create/modify schema routine 300. Alternatively, if optimization program 200 verifies that there is not at least one schema defined which incorporates the current metadata (no branch, decision 218) the create/modify schema routine 300 is entered. For example, an event or subsequent action modified the current metadata after the schema scope check was passed.

If at least one schema exists that incorporates all the applicable metadata (yes branch, decision 218), the schema will subsequently be retrieved. Based on user preferences, optimization program 200 may identify multiple schema which differ only by the display device(s) required. One or more schema may be retrieved (step 220). Unless a primary/alternate flag is set within the schema, the default behavior may define the primary schema as the schema which incorporates all available display device(s). Having an alternate schema retrieved may allow a less disruptive transition of the GUI environment for the user. For example, undocking a laptop from a multi-display computing environment.

If optimization program 200 determines that the display device(s) availability information is verified for the primary schema (yes branch, decision 222), optimization program 200 spawns the application(s) and window(s) as defined in the schema (step 230) and populates the application(s) and window(s) into the location(s) in the primary window(s) (step 232) and/or dynamic window(s) (step 234).

Looking back to decision 222, if the test for the primary display device(s) availability fails (no branch, decision 222), then the optimization program 200 may select an alternate schema that will function with the available display device(s) (step 224).

Optimization program 200 spawns the application(s) and window(s) as defined in the alternate schema (step 230) and populates the application(s) and window(s) into the location(s) in the primary window(s) (step 232) and/or dynamic window(s) (step 234).

Optimization program 200 stores the active: application(s) and window(s) metadata and the primary window area(s) 232 and dynamic window area(s) 234 metadata in database 250 (step 236).

Figure 3:
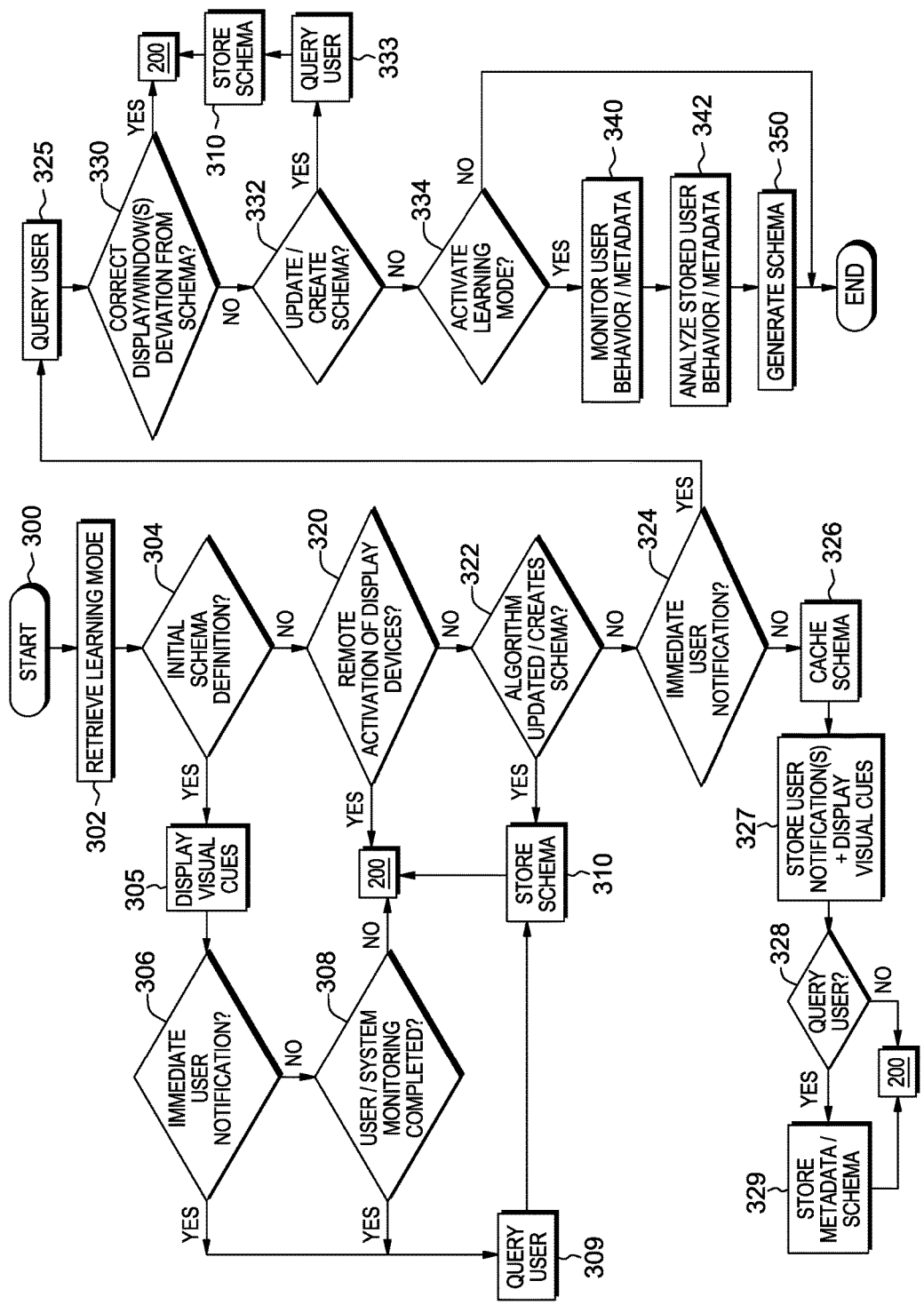
FIG. 3 illustrates operational steps of an error handling function in accordance with one embodiment of the present invention, as pertaining to the creation of new schema, updating of current schema, remotely activating display device(s), and response to changes that require user intervention.

FIG. 3 illustrates the operational steps of an error handling routine in accordance with one embodiment, as pertaining to, but not limited to, creation of new schema, updating of current schema, remotely activating display device(s), program learning, and querying the user to respond to events that require user intervention. The types of display device(s) which may be remotely activated may be a discreet monitor or TV; integrated display as on a laptop computer, a tablet computer, a netbook computer, a personal digital assistant (PDA), or a smart phone; digital projector; VR goggles; helmets; heads-up display or any programmable electronic device capable of producing an image. Communication with these display device(s) can be by, but is not limited to, LAN, WAN, Bluetooth, or wireless.

The steps on the flowchart in FIG. 3 may or may not happen in a concurrent fashion. Data transfers can occur synchronously, asynchronously, or delayed.

Create/modify schema routine 300 retrieves learning mode information from database 250 (step 302). Learning mode(s) may be activated or deactivated from user interface 120 or by retrieved user preferences. Within the user preference data the user may define a visual cue (e.g., icon or flag) and the location (e.g., task bar) to indicate the type and number of user notification. An example of one embodiment of a simple learning mode, the user presets initial schema flag=yes, pass through the user/system monitoring (decision 308) five times each time returning to optimization program 200, next the user initiates a new application window and associated metadata. On the subsequent loop, a sixth application and window is added triggering a status=complete (yes branch, decision 308). The simple learning mode will query the user and activate user interface 120. The user may assign the six application windows to their respective primary windows area(s) 232 and dynamic window area(s) 234. At this point the user may also include metadata triggers or priority hierarchy before storing the schema.

Alternatively, an embodiment of a sophisticated learning mode may be activated, which bypasses decision steps 304, 320, 322, 324, 330, and 332 and activates the yes branch of decision 334. The sophisticated learning mode monitors the user's behavior over a period of time and generates a group of schema which are assigned a status of initial schema flag=yes. This embodiment may then deactivate the learning mode and proceed to initial schema definition branch where the user may at least review the suggested schema, assign metadata triggers, assign application windows to their respective primary windows area(s) 232 and dynamic window(s) area 234, or delete suggested schema which the user does not need.

If the learning mode is a default null or deactivated mode, decision blocks within create/modify schema routine 300 will revert to original behaviors.

Create/modify schema routine 300 analyzes user preferences, initial schema flag, or completeness of schema (decision 304). If create/modify schema routine 300 determines the status to be initial schema flag=yes (yes branch, decision 304) then create/modify schema routine 300 displays one or more visual cue (step 305). User preferences are checked to determine if a visual cue will be presented, the type of visual cue, and the location of the visual cue. An example of the visual cue may be a "recording" icon placed in the task bar with a number next to it indicating the user is creating a schema and the number of applications currently stacked in the schema.

Create/modify schema routine 300 analyzes retrieved user preferences to decide if immediate user notification is required, and if the user has identified any additional responses governed by this decision (decision 306). If create/modify schema routine 300 determines that immediate user notification is required (yes branch, decision 306), then the user will be queried (step 309). Whereas the user is in the initial schema section of the create/modify schema routine 300, the default interaction with the user will be to activate the user interface 120 unless overridden by user preferences. User interface 120 allows the user full access to the schema definition including, but not limited to, schema name, assign metadata triggers, assign application windows to their respective primary windows area(s) 232 and dynamic window area(s) 234, create prioritization hierarchy, visual or audio cues, and alternate display device configuration(s).

Create/modify schema routine 300 stores schema (step 310) after schema definition creation is complete; then optimization program 200 resumes control.

An example of schema creation via a "step-by-step" method may be the user activates the user interface 120 and sets the preferences to learning mode=off, initial schema flag=yes, and immediate user notification=yes. Next the user activates an application, sizing the application window and positioning the application window on the desired display device. Schema creation/modification routine 300 executes step 302, 304, and 306 without external intervention and proceeds to query the user. Querying the user, may in one embodiment, activate user interface 120. The user may designate the current window to a primary window area 232 or a dynamic window area 234 and assign metadata triggers, leave the initial schema flag=yes, and name the schema. The schema is stored and optimization program 200 resumes control, executing in monitoring mode. The user may repeat the sequence of activating and placing an application, querying the user, updating schema definition via user interface 120, and storing schema until the GUI environment is populated with applications required for the user's current needs. During the querying step, for the final application to be configured, the user may set the initial schema flag=no and add prioritization hierarchy if required.

Alternatively, if immediate notification is not required (no branch, decision 306), create/modify schema routine 300 analyzes retrieved user preferences and any inputs from the user interface 120 to decide if user/system monitoring is active, the requirements are to satisfy the completion criteria (decision 308), and if the user has identified any additional responses governed by this decision. If user/system monitoring is active (no branch, decision 308), create/modify schema routine 300 returns control to optimization program 200.

In the previous example, the user was working in a loop of undefined duration. If the user inputs a fixed duration or number of passes through decision 308, the user delays interacting with the query user step until all application(s) and window(s) can be defined (yes branch, decision 308).

Next, create/modify schema routine 300 queries the user. Whereas the user is in the initial schema section of the create/modify schema routine 300, the default interaction with the user may be to activate user interface 120 unless overridden by user preferences. User interface 120 allows the user the full access to the schema definition. In this embodiment of schema creation the user may assign, including but not limited to, schema name, assign metadata triggers, assign application windows to their respective primary windows area(s) 232 and dynamic window area(s) 234, create prioritization hierarchy, visual or audio cues, and alternate display device configuration(s). Configuring the prioritization hierarchy may be more efficient in so much as the user may view the metadata and metadata triggers as a larger group of data in contrast to the information segmented into discrete blocks defined in the step-by-step schema creation.

Looking back to step 304, if create/modify schema routine 300 determines the schema status is initial schema flag=no (no branch, decision 304), then create/modify schema routine 300 determines whether to remotely activate the display device(s) (decision 320).

Whereas optimization program 200 has limited autonomy to respond to display device(s) availability, deviations in schema from available metadata or metadata triggers, or user changes to the GUI environment, which are outside the scope of the current schema, the user may allow create/modify schema routine 300 a plurality of steps that can respond to increased autonomy.

If user preferences allow for autonomous interaction with display device(s) (yes branch, decision 320), create/modify schema routine 300 remotely activates display device(s) required to match the scope of primary or alternate schema required by the metadata and triggers.

Optimization program 200 resumes control and system data is reanalyzed to verify if the system metadata contains display device(s) data. If the metadata comparison detects a change, further schema analysis may occur during optimization program 200. If no change occurs, indicating a failure to remotely activated required display device(s), decision 320 will be defaulted to the no branch for the current schema.

Alternatively, if remote activation of display devices is not allowed or a "no" default is set (no branch, decision 320), create/modify schema routine 300 analyzes user preferences or input from user interface 120 to decide if automatic updates or schema creation is allowed (decision 322). In one embodiment, the user may allow create/modify schema routine 300 to automatically add any changes which occur to the schema as the user works directly to the current schema (yes branch, decision 322). Alternatively, the user may set the preference for decision 322 to create and add an identifier to the current schema's name. An example of this schema name creation may be "current schema name"_"system date"_rev#. When the schema updates or creations are complete, the schema is stored and optimization program 200 resumes control.

Alternatively, if routine updates/creates schema is not allowed (no branch, decision 322), create/modify schema routine 300 determines whether to provide immediate user notification (decision 324).

In this embodiment of the immediate user notification (decision 324) there are a plurality of decisions that may trigger one decision branch as opposed to the other branch. The decisions may comprise information from user preferences, prioritization hierarchies, events occurring outside the schema scope, "critical" or "important" information flags, and notification accumulation. Whereas optimization program 200 is constantly monitoring the user, system, and applications, multiple executions of create/modify schema routine 300 may occur, and a subset of those executions may trigger a user notification. The user notification may be tagged to add granularity of the data. Examples of tags which may be applied to a notification may be, but are not limited to, time stamps, priority threshold, number of occurrences, or schema effected.

If events initiating the user notifications are considered non-critical and there are no criteria which over-rule the decision (no branch, decision 324) the current schema is cached (step 326).

Whereas displaying visual cues was part of the initial schema definition loop, the user notifications following decision 324 may more often correspond to a plurality of different events stored (step 327). Within the user preference data the user may define a visual cue (e.g., icon or flag) and the location (e.g., task bar) to indicate the type and number of user notifications which have occurred.

One embodiment of the user notification with displayed visual cues may analyze the user preferences and current schema to determine that unallocated space exists within the GUI environment where a small, temporary window may be created, and the temporary window may be populated with icons relative to types of user notifications and numbers next to the icons representing the number of occurrences for each type of notification.

Create/modify schema routine 300 analyzes user preferences to determine when to query the user (decision 328). If create/modify schema routine 300 determines that it is acceptable to accumulate multiple user notifications (no branch, decision 328), the user interface 120 is not activated and then optimization program 200 resumes control.

Subsequently, if one or more stored notifications is determined to be important by create/modify schema routine 300 (yes branch, decision 328), user interface 120 may be activated to query the user. The user responds to the notifications as appropriate to their nature. For example, schema may be updated, prioritization hierarchy modified, instant messages read/responded, and metadata triggers added. Schema and metadata are stored (step 329), and optimization program 200 resumes control.

Looking back to decision 324, if create/modify schema routine 300 determines that immediate user notification is required (yes branch, decision 324), create/modify schema routine 300 queries the user (step 325). Whereas this decision is normally related to a singular notification, create/modify schema routine 300 may identify the source of a notification triggering event without activating the user interface 120 by default. The user may have the option of activating user interface 120 if additional information about the triggering event is required or the user needs other controls within user interface 120.

If create/modify schema routine 300 determines that the triggering event is related to the display device(s) or window(s) required for the schema, create/modify schema routine 300 pauses (decision step 330) and allows the user to correct the error before proceeding. Examples of events which may trigger decision 330 may be, but are not limited to, laptop has been undocked and access to dual monitors is lost, linked electronic device with embedded display transitions to a power saving mode, or user accidentally minimized an application window to read instant messages that are hidden in the background and did not resize the application window before continuing. If the user corrects the cause of the triggering event and identifies the error as corrected (yes branch, decision 330), the create/modify schema routine 300 returns control to optimization program 200. Subsequently, optimization program 200 automatically verifies that the triggering event is corrected. If not, a new message may be displayed at query user step 325.

If the user cannot correct the triggering event (no branch, decision 330), the create/modify schema routine 300 prompts the user to update/create a schema based on the current system and GUI environment. If the user chooses to update the current schema or create a new schema based on the current configuration and metadata (yes branch, decision 332), then the user will be queried (step 333).

Query user (step 333) activates user interface 120 and allows the user the full access to the schema definition. In this embodiment, the user may modify or add information, including but not limited to, schema name, metadata triggers, assign application windows to their respective primary window area(s) 232 and dynamic window area(s) 234, create/update prioritization hierarchy, add visual or audio cues, and alternate display device configuration(s). After the user has completed updates, the schema is stored and optimization program 200 resumes control.

Looking back to decision 332, if the user chooses not to update or modify the current schema that has changed from its initial configuration (no branch, decision 332), then create/modify schema routine 300 analyzes the user preferences or learning mode information (decision 334). The default response is not to enter the learning mode loop (no branch, decision 334). If create/modify schema routine 300 determines that the learning mode is not active (no branch, decision 334), then the current changes are not saved and optimization program 200 resumes control.

If the user chooses to ignore current changes but prefers to avoid subsequent query user messages, the user may activate user interface 120 and flag this notification for delayed notification and query user before continuing work.

If the learning mode is active (yes branch, decision 334) the learning algorithms will monitor the user behavior (e.g. applications activated, window placement, files accessed, etc.) and metadata (e.g., time and date information of user actions, other schema used, display device availability, or keywords searched) (step 340). This information will be stored in database 250.

An embodiment of the learning mode analyzes the stored user behavior and metadata (step 342). Based on user preferences after the amount of monitoring data gathered and/or the duration of monitoring has occurred, optimization program 200 may generate a plurality of schema (step 350) for the user. The generated schema will be flagged as initial schema flag=yes and presented to the user for review and/or modification either directly through user interface 120 or the yes branch of step 304. Schema identified by the user to be saved are stored at step 310. As one of the more sophisticated embodiments of this invention, the learning algorithms within optimization program 200 represent an AI (artificial intelligence) like behavior.

FIGS. 4a, 4b, 4c, and 4d collectively mimics a possible real-world scenario on a computer system comprised of two display devices of differing size and resolution and a user employing a schema operation within an embodiment of this invention to facilitate the completion of a monthly report. During this example of a possible real-world scenario the schema initiates responses to metadata triggers that the user has defined. Embodiments of this invention may reconfigure the display devices as defined by the schema. Events not defined within the schema can be handled by a different portion of the embodiment of this invention.

The possible real-world scenario of the monthly report requires the user to integrate information provided by members of the user's department. In the scenario, the user is required to provide a presentation which includes a graphic in the form of a chart created by a spreadsheet program. The spreadsheet program requires inventory and payroll data to create the chart.

FIG. 4a graphically depicts an embodiment of this invention that the user is employing for this scenario. A schema comprised of two active display devices (left display 401, right display 402), which are initially comprised of, one dynamic window 410 executing three applications app 450, 451, 452, and two primary windows each containing an application executing in a mode such that the application fills the primary window area (primary window 420 executing app 440 and primary window 421 executing app 441). This schema creates the primary windows in the display device which has the larger screen area. Optimization program 200, using system metadata 117 (reference step 204 of FIG. 2), determines that right display 402 has the larger image area and spawns the primary window(s) and populates them with the applications defined in the schema (primary window 420 executing app 440 and primary window 421 executing app 441).

By definition, within the embodiment of this schema, the primary windows and associate applications (primary window 420 executing app 440 and primary window 421 executing app 441) are identified as "locked" and optimization program 200 cannot modify this configuration. However, optimization program 200 "remembers" the configuration via cached data (reference step 216 of FIG. 2) and stored window(s) metadata (reference step 236 of FIG. 2). It the user manually changes the application(s) and window(s) assigned in this example to the right display 402, the user may return the right display 402 to its original state providing the user has not saved changes under the current schema's name.

Further describing the graphics comprising FIG. 4a, optimization program 200 also determines from the schema that a single dynamic window 410, containing three applications, app 450, 451, and 452, will be placed within left display 401. Further analysis by optimization program 200 (reference FIG. 2) of the schema and system metadata 117 determines the size of dynamic window 410 will be 45% of the area of left display 401, and dynamic window 410 will be positioned on the right side of the GUI environment allowing application icons to be visible within the GUI environment without altering the arrangement of those icons. In an alternate schema or embodiment of this invention the dynamic window size and location may be fixed; however, optimization program 200 may allow relocation of application icons in the GUI environment to areas of left display 401 unassigned to the dynamic window 410, based on user preferences. Furthermore, within this possible real-world scenario the user requires specific applications executing within the dynamic window 410 on the left display 401. The schema defines that 25% of dynamic window 410 will be assigned to an instant messaging program app 450, 25% to an e-mail program app 451, 25% to a Web browser program app 452. Although the remaining 25% initially remains unassigned, it is assigned a user preference which allows another messaging application (list embedded within the schema) to be activated by the user, placed in this location and be considered "within schema scope" via optimization program 200; thereby not triggering a user notification. Alternatively, dynamic window 410 may allow a fourth application to be spawned by a metadata trigger. Examples of metadata as relevant to an embodiment of the invention include, system data such as time and date, information about connected devices, communication events, application data such as window size, location, and zoom level, and transactional data such as files accessed, Web page URL, text in a message "subject line", and removable storage media read.

The current schema has primary metadata triggers set for either an email with "payroll" or "inventory" contained in the subject line, or an instant message with "payroll" or "inventory" contained within a message. Furthermore, to reduce the probability of an interruption prior to receiving data which the user is awaiting, the user activates user interface 120 (reference FIG. 1) and sets a secondary metadata trigger based on a "priority" flag on an incoming email or instant message. Only messages with "critical" or "high" priority flags are allowed to "interrupt" the user. The user has further restricted a response to messages to only identify the subject line in the reduced size window, and the window will only resize if the user selects it. In the prior embodiment of dynamic window 410, this response may create the window identified in FIG. 4a as placeholder msg#2P.

FIG. 4b graphically depicts the visual response to the progress of the possible real-world scenario. In this embodiment of the invention, dynamic window 410 identifies metadata trigger "payroll" occurred within the subject line of an e-mail message app 451. Optimization program 200 (reference FIG. 2) uses information contained within the schema to modify the behavior of the window wherein app 451 is executing. The schema response is changed to focus on app 451 and maximize the window to the size of the dynamic window 410.

In this example, app 451 is of critical interest to the user. However, the optimization program 200 (reference FIG. 2) changed the visual aspect of app 451 within dynamic window 410; the schema did not indicate that app 450, app 452, or msg#2P and their associated windows were closed. App 450, app 452, and msg#2P and their associated windows are still executing in the background of dynamic window 410.

FIG. 4c graphically depicts the visual response to new events with the possible real-world scenario. A second metadata triggered event identified as critical by the user occurs before the user completes the work in dynamic window 410, app 451, and the window for app 451 is reset to the original size FIG. 4a. Optimization program 200 (reference FIG. 2) identifies metadata trigger "inventory" occurred within the text of instant message app 450. The prioritization hierarchy defined within the schema prevents optimization program 200 modifying dynamic window 410 with app 451 in its current state. However, the prioritization hierarchy identifies maintaining unassigned space within the GUI environment as a lower priority than responding to a metadata trigger identified as critical. The schema defined by the user allows a new dynamic window 411 to be created in the remaining unassigned space within the GUI environment of the left monitor 401. Based on the schema, optimization program 200 moves app 450 from its current size and state in the background of dynamic window 410 and resizes app 450 to the maximum size of the new dynamic window.

In a further embodiment of the schema's behavior, a third event occurs during this period and no unassigned area remains within the GUI environment of left display 401. The optimization program 200 (reference FIG. 2) analyzes the schema's priority hierarchy to determine if the third event is a higher priority than the current dynamic window and applications. If the third event has a lower priority, optimization program 200 passes the third event to the create/modify schema routine 300 (reference step 300 in FIG. 2). Create/modify schema routine 300 (reference FIG. 3) will review user preferences and the prioritization hierarchy to determine if any user notification is required. In the context of the possible real-world scenario, the user may be working with information on both the left monitor 401 and the right monitor 402 so a new instant message about "a coffee break" may be identified by user preferences or predefined default responses as a "distraction" by optimization program 200, and the user receives no notification.

Alternatively, if user notification is required, create/modify schema routine 300 determines if the user notification is immediate or whether the notification may be delayed. User preferences may identify a flag or icon appropriate to the event to be placed in an area that minimizes the interruption to the user, such as the task bar, to notify the user of the type of event that occurred. An example of subsequent event within the possible real-world monthly report scenario which may initiate a delayed user notification may be that the user notices a payroll data discrepancy. The user questions the payroll data which arrived via an attachment to the e-mail (reference app 451 of FIG. 4b), and the user must contact an author of the payroll data. The users contacts the author of the payroll data using instant messaging (reference app 450 of FIG. 4c).

FIG. 4d graphically depicts the outcome of the hereafter described actions by the user. The user and author of the payroll data cannot resolve the discrepancy via instant messaging. Next the user manually overrides the schema which optimization program 200 is monitoring. Whereas the user returns the e-mail and instant message applications to their original size within dynamic window 413 this action alone does not create enough unassigned area within the GUI environment to allow the user to execute the communication programs the user requires to resolve the payroll data discrepancy. The user next moves the dynamic window 413 to the upper left corner of the left screen and reduces its size. As an embodiment of this invention the application windows within the dynamic window 413 will scale down as the dynamic window's size decreases. The user has activated a video conferencing program, identified as non-schema app 460, so that the user can talk to his colleague and a digital whiteboard, identified as non-schema app 461, so the payroll data author can graphically explain the situation and background as it relates to the information in question.

In parallel, optimization program 200 detects the changes outside of the scope of the schema and activates create/modify schema routine 300. Based on user preferences, create/modify schema routine 300 responds to the event with a delayed user notification and places a user notification icon in the task bar. The user notification icon chosen by create/modify schema routine 300 may identify to the user that a schema change has occurred. When the user completes resolving the payroll data discrepancy, the user may select the user notification icon to activate the user interface 120 (reference FIG. 1). The user may elect to ignore the changes to the schema, close the user interface 120, and return control to optimization program 200. Unless the user specifies to "close" optimization program 200 and return control to the native GUI environment, or select a different schema, optimization program 200 may reset the window(s) and applications to their initial condition as seen in FIG. 4a unless a different default condition is set. In another embodiment of this invention, left display 401 is the display of a laptop computer. If the user disconnects the laptop from right display 402 to take the laptop to the office of the author of the payroll data, optimization program 200 detects that change within the system metadata 117. If an alternate schema was defined, the decision 222 step (reference FIG. 2) changes, the alternate schema is selected, and the laptop's display is populated with window(s) and application(s) as defined in the alternate schema.

An example of this may be the primary focus of the laptop screen mimicking the visual appearance of the right display 402 as depicted in FIG. 4a and a cached version of the left display 401 remains in the background. A "hot key" combination defined in the schema and recognized by optimization program 200 via system metadata 117 (reference step 204 of FIG. 2) may allow the user to swap between the appearance and applications normally configured for the left display 401 and the appearance and applications normally configured for the right display 402.

Figure 5:
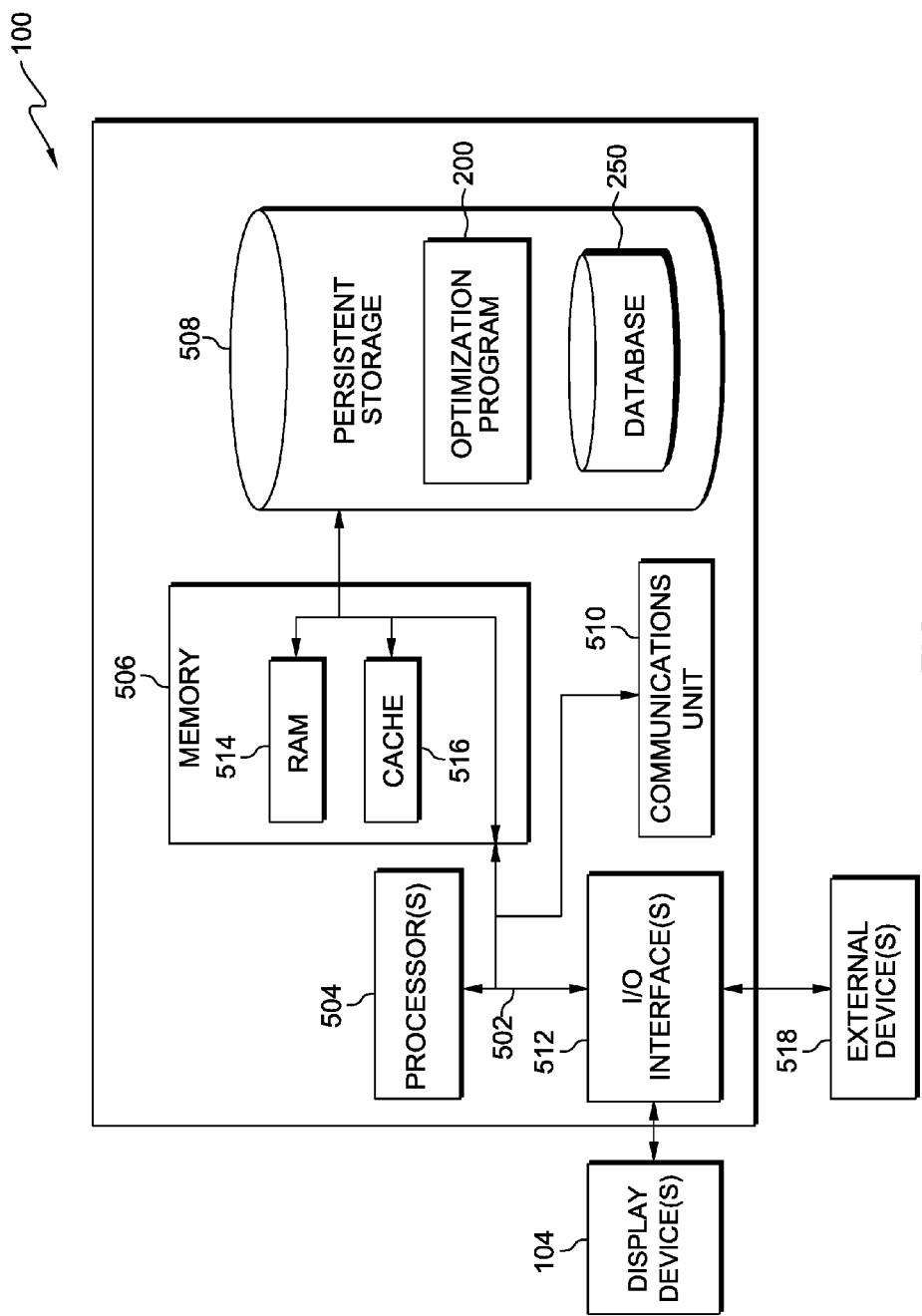
FIG. 5 depicts a block diagram of components of the computer system.

FIG. 5 depicts a block diagram of components of computing environment 100 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing environment 100 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Optimization program 200 and database 250 are stored in persistent storage 508 for execution and/or access by one or more of the respective computer processor(s) 504 via one or more memories of memory 506. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including systems and devices within or controlled by computing environment 100. In these examples, communications unit 510 includes one or more wireless network interface cards. Communications unit 510 may provide communications through the use of either or both physical and wireless communications links. Optimization program 200 and create/modify schema routine 300 may be downloaded to persistent storage 508 through communications unit 510.

I/O interface(s) 512 allows for input and output of data with other devices that may be connected to computing environment 100. For example, I/O interface(s) 512 may provide a connection to external device(s) 518 such as a keyboard, a keypad, a touch screen, and/or some other suitable input device. External device(s) 518 can also include portable computer readable storage media such as, for example, thumb drives, portable optical or magnetic disks, and memory cards. Software and data used to practice embodiments of the present invention, e.g., optimization program 200, create/modify schema routine 300, optimization database 250, can be stored on such portable computer readable storage media and can be loaded onto persistent storage 508 via I/O interface(s) 512. I/O interface(s) 512 also connect to display device(s) 104.

Display device(s) 104 provide a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for providing dynamic placement of computer-based windows, the computer program product comprising:

one or more computer readable storage media and program instructions stored on the one or more computer readable storage media, the program instructions comprising:

program instructions to display a first window corresponding to an aspect of a first executing program in a display area on one or more display devices;

program instructions to identify an activity of a second program;

program instructions to identify an activity of a third program;

program instructions to determine whether the activity of the second program meets a threshold of priority value, wherein determining whether the activity of the second program meets the threshold of priority value comprises:

program instructions to determine an activity level corresponding to the first executing program;

program instructions to adjust the threshold of priority value based on the activity level corresponding to the first executing program;

program instructions to identify the second program and data associated with the second program;

program instructions to determine a relationship between the data associated with the second program and data associated with one or more executing programs utilizing the display area;

wherein the data associated with each of the one or more executing programs and the second program includes metadata, the metadata comprising: application name and version number, application window size and location, dialog box modality, subject line text, access authority, data owner, script and macro names, Uniform Resource Locators (URLs), user ID and password, and date last accessed;

program instructions to determine a priority level associated with the activity of the second program based, at least in part, on a relationship between the data associated with the second program and data associated with the one or more executing programs; and program instructions to compare the priority level associated with the activity of the second program to the threshold of priority value;

responsive to determining that the activity of the second program meets the threshold of priority value, program instructions to manipulate the first window to distribute the display, at least partially, between the first window and a second window corresponding to the activity of the second program, wherein manipulating the first window comprises dynamically reshaping the first window within the display area and relocating the first window within the display area;

program instructions to display the second window with the first window within the display area, wherein the second window is a fixed shape, as defined by a user, and does not dynamically reshape, and wherein the first window is a dynamic window that is capable of dynamic reshaping, the dynamic reshaping capability includes changing a size of the dynamic window to allow a portion of an underlying desktop to be visible; and program instructions to determine that the activity of the third program does not meet the threshold of priority value; and responsive to determining that the activity of the third program does not meet the threshold of priority value, program instructions to display a visual aspect of the third program in another display area.

\* \* \* \* \*